Figure 1:
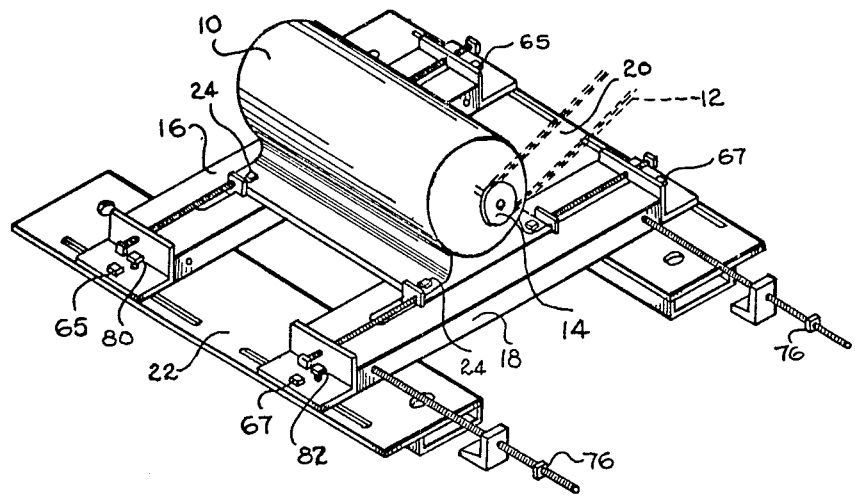

United States Patent [19]

Duceppe

[11] 4,012,021
[45] Mar. 15, 1977

[54] MULTI-ADJUSTABLE ELECTRIC MOTOR SUPPORT

[76] Inventor: Rolland R. Duceppe, 2227 1st St., Richelieu, Quebec, Canada

[22] Filed: Apr. 9, 1975

[21] Appl. No.: 566,367

[52] U.S. Cl. .................................. 248/23; 310/91
[51] Int. Cl.² .......................................... H02K 5/00
[58] Field of Search ..................... 310/91; 248/23

[56] References Cited
UNITED STATES PATENTS

| | | | |
|---|---|---|---|
| 2,628,047 | 2/1953 | Herder et al. ....................... | 248/23 |
| 2,765,997 | 10/1956 | Motts ................................ | 248/23 |
| 3,066,898 | 12/1962 | Haynes .............................. | 248/23 |
| 3,652,044 | 3/1972 | Manross ............................. | 248/23 |

*Primary Examiner*—Donovan F. Duggan
*Attorney, Agent, or Firm*—Roland L. Morneau

[57] ABSTRACT

An adjustable support for an electric motor to enable the alignment of the latter. The support is made of two pairs of superposed beams transversely disposed relative to each other. The motor rests on the top beams and is displaced in the direction of these beams with threaded rods mounted through the ends of the latter. The top beams are slidingly mounted on the lower pair of beams by means of bolts in one pair passing through slots in the other pair. Each end of the top beams carries a screw which abuts against the lower beams. The turning of these screws causes the spacing or the tilt to vary between the two pairs of beams.

2 Claims, 7 Drawing Figures

MULTI-ADJUSTABLE ELECTRIC MOTOR SUPPORT

The present invention relates to a new and useful support for electric motor and in particular to a mount adapted to be adjustable along two perpendicular coordinates and angularly tiltable along these coordinates.

Belts actuated by electric motors are known to wear quickly on account of a lack of proper adjustment or alignment of the motors. Supports for electric motors do not provide sufficient adjustments to allow the belt driven by the motor to ride on a pulley with the desired tension and alignment. The present support allows the motor to be displaced longitudinally, transversely and also allows a slight tilt of the motor to compensate for the lack of level of the base on which these supports are mounted.

The support is constituted of two pairs of crossed beams designed in such a way as to enable the sliding of the beams over each other along their full length.

An additional advantage of the new support is to allow a smooth and easy sliding of the superposed beams.

Another advantage of the present support is that it permits a complete and smooth movement of all its adjustments with one and the same key wrench.

The support, according to the invention, comprises a first pair of parallel beams for supporting the motor, each one of the first beams is provided with a slot therein, and two guide means slidingly mounted in each slot for abutting against the side of the motor; the motor is adapted to be releasably secured to the first beams through the slots; screw means are threadedly engaged at each end of the first pair of beams and abut against the guide means for slidingly displacing the motor over the first beams; a second pair of parallel beams is transversely disposed under the first beams and connected to the latter by tightening bolts; the second beams have a substantially rectangular cross-section and a lip extending outwardly of the top surface thereof; each lip is provided with a slot for receiving a tightening bolt mounted at the end of the first beams and adapted to immobilize in translation the first beams; spacing means threadedly mounted between the two pairs of beams at each end of the first beams for slightly changing the angle of at least one of the first beams relative to the second beams.

Threaded rods are also foreseen to be threadedly mounted on the outer side of one of the first beams and aligned therewith and to slidingly carry a block adapted to abut against the end of the second beams, the said block being pushed by nut means threadedly mounted on the threaded rods.

Figure 2:
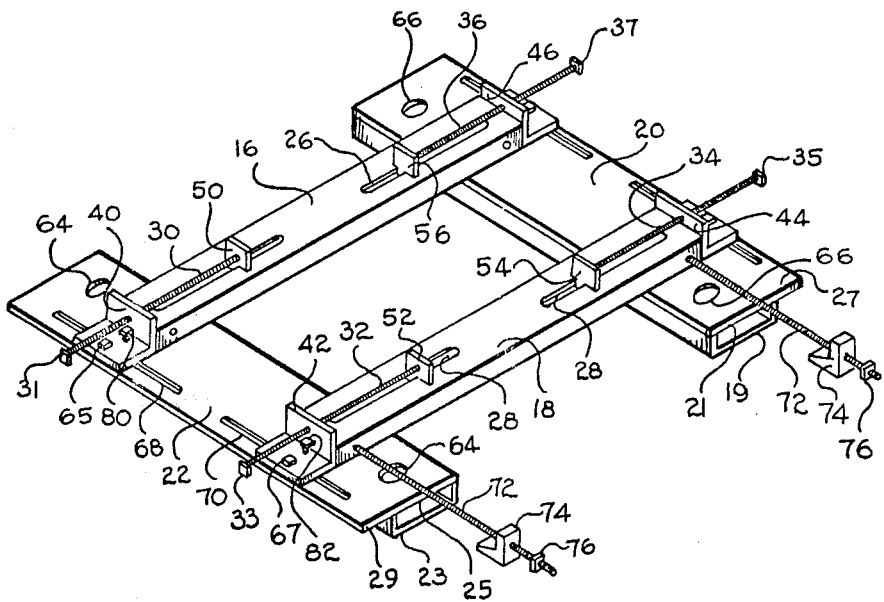
Figure 3:
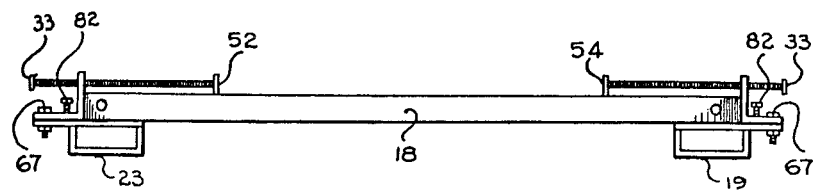
Figure 4:
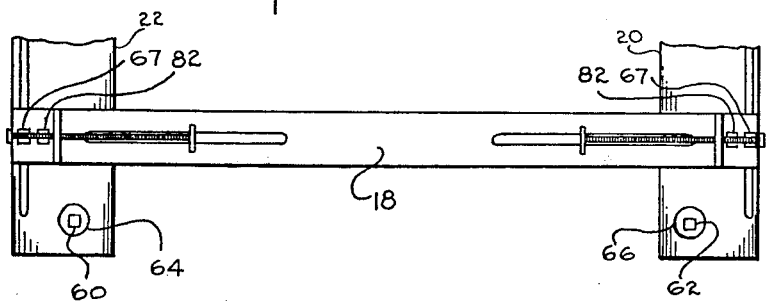
Figure 7:
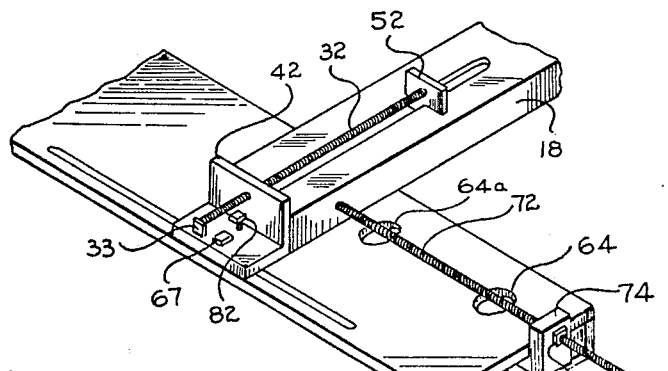
Figure 5:
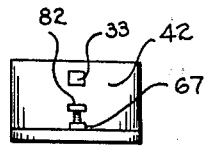
Figure 6:
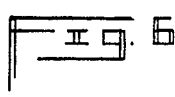

The invention will now be described in greater details by referring to the drawing, wherein;

FIG. 1 is a perspective view of an embodiment of the new support carrying a motor according to the invention, FIG. 2 is a perspective view of the support without the electric motor, FIG. 3 is a side view of the support shown in FIG. 2, FIG. 4 is a top view of one end of the support shown in FIG. 2, FIG. 5 is an end view of one of the top beams of the support, FIG. 6 is a perspective view of a sliding guide for the motor, and FIG. 7 is a perspective view of one corner of the support illustrating the means for sliding the upper beams of the support as shown in FIG. 1.

FIG. 1 illustrates a motor 10 mounted on a support according to the invention which may be moved longitudinally and transversely and which may be set in an inclined position. These various movements of the motor will enable to obtain the appropriate tension alignment and orientation of the belt 12 which is driven by the rotating wheel 14.

The adjustable support is essentially made of two upper beams 16 and 18 and two lower beams 20 and 22 disposed transversely under the upper beams. The motor 10 is adapted to rest on the upper beams 16 and 18 and to be fixed by bolts 24 through the slots 26 and 28 provided in the beams 16 and 18. When the bolts 24 are loosened, the motor can be displaced by the threaded rods 30 and 32 or 34 and 36 threadedly engaged respectively in the angular plates 40, 42, 44 and 46. The rods 30, 32, 34 and 36 abut against the guides 50, 52, 54 and 56 which can slide respectively in the slots 26 and 28 to push the motor in the desired direction. The threaded rods are provided with square or hexagonal heads 31, 33, 35 and 37 which can be rotated by a key wrench. The guides 50, 52, 54 and 56 (FIG. 6) are small plates having slots on their lateral edges to retainably slide in the slots 26 and 28.

The beams 20 and 22 support the ends of beams 16 and 18 and permit their sliding thereon. Beams 20 and 22 are made of U-shaped sections 19 and 23 over which is welded plates 21 and 25. These plates 21 and 25 have lips 27 and 29 which extend outwardly of the U-shaped sections 19 and 23 away from the motor 10. The beam 22 is fixed to a rigid base by screws 60 (FIG. 4) passing through the apertures 64 and holding the lower surface of the section 23. In a similar manner, the beam 20 is fixed to the rigid base by screws 62, (FIG. 4) passing through the apertures 66 and holding the lower surface of section 19. The lip 29 is provided with two longitudinal slots 68 and 70. The sliding movement of the beam 16 is restricted by a bolt and nut 65 which pass through the slot 68 and the angular plate 40. The sliding movement of the beam 18 can be also restricted by a bolt and nut 67 which pass through the slot 70 and the angle plate 42. The restriction of the beams 16 and 18 is similarly obtained through the angular plates 44 and 46. The fact that the screws 60 and 62 are recessed below the plates 21 and 25, permits the beams 16 and 18 to slide the full length of the beams 20 and 22 without hindrance over the surface of the plates 21 and 25. In order to permit the beams 16 and 18 to not cover the means for holding down the beams 20 and 22, additional holes adjacent to hole 64 and 66 are provided as shown in FIG. 7. Hole 64a will be used when hole 64 is covered by the beam 18.

When a motor is mounted on beams 16 and 18, the latter would normally have to be hit by a hammer or the like for shifting them. In order to obtain a smooth and precise shifting, a set of threaded rods 72, blocks 74 and nuts 76 is used. For shifting the beams 16 and 18 to the right in FIG. 2, and consequently the motor mounted thereon, the rods 72 are threadedly engaged to the beam 18 and the blocks 74 which are slidingly mounted thereon are pushed by nuts 76 threadedly engaged on the rods 72. The blocks 74 are preferably L-shaped so that one arm is wedged in the hollow part of the beams 20 and 22 while the other arm abuts against the end of the latter beams. The rotation of the nuts 76 slowly pulls the motor to the right (as shown in FIGS. 2 and 7). A similar but opposite movement of the motor may be obtained by mounting the rods 72, blocks 74 and nuts 76 to the beam 16 on the opposite side of the beam 18.

A slight tilt of the motor is obtained by raising at least one end of the beams 16 or 18. To achieve this result, bolts 80 and 82 are threadedly mounted through the horizontal face of the angular plates 40, 42, 44 and 46. The lower end of the bolts 80 and 82 abuts against the top face of beams 20 and 22 and more particularly on the lips 27 and 29. It is usually preferred to locate the bolts 80 and 82 just above the outer upper edge of the U-shaped beams 19 and 23. The tilt which is usually desirable requires that both ends of beam 16 or of beam 18 be raised simultaneously to give the proper orientation to the pulley 14.

In order to facilitate the adjustment of the support and to require less tools, the heads of all the bolts, screws and nuts used are of the same size. This way, only one wrench can be used for doing all the operations.

The mode of operation of the invention is as follows

The motor 10 is mounted on beams 16 and 18 and loosely retained thereon by bolts 24 between the guides 50, 52 and 54 and 56. While the bolts 65 and 67 at both ends of the beams 16 and 18 are still loose, the latter beams are approximately shifted sideways with the use of the threaded rods 72, blocks 74 and nuts 76. The tension on the belt 12 is then adjusted by moving the threaded rods 30, 32, 34 and 36 to the needed position while at the same time correcting any lateral adjustment with the blocks 74. When the motor 10 has reached its best acceptable position along these two coordinates, the motor is tightened with bolts 24. If a small tilt of the motor is needed to correct a twist of the belt 12, both screws 80 or 82 at each end of the beam 16 or 18 are rotated to cause a difference in level between the beam 16 and 18. When the proper tilt is obtained and accurate shims inserted, the bolts 65 and 67 are tightened at both ends of the beams 16 and 18. It is understood that beams 20 and 22 are accurately levelled at installation.

When the proper adjustment of the motor is reached, the belt 12 runs smoothly in the groove of the pulley 14 with a minimum of wear.

What I claim is:

1. A support for mounting a motor in a variety of flat and angular positions, the said support comprising;
   a first pair of parallel beams for supporting the said motor, the said first beams comprising a reversed U-shaped cross-section and an L-shaped rigidly secured at each end thereof, each of said first beams being provided with a slot in the upper surface thereof, and two guide means slidingly mounted in each said slot for abutting against the side of the motor, the said motor being adapted to be releasably secured to said first beams through said slots,
   screw means threadedly engaged through said L-shaped plates at each end of said first pair of beams and abutting against the said guide means for slidingly displacing the said motor over said first beams,
   a second pair of parallel beams transversely disposed under said first beams, the said second beams being rectangular hollow channels having flat top and lower surfaces, and a lip extending outwardly of and in the same plane as said top surface, each said lip being provided with a slot for receiving a tightening bolt mounted through said L-shaped plates at the end of said first beams and adapted to immobilize in translation the said first beams, the said top surface of the second beams being provided with holes for receiving bolts adapted to sink below the upper surface of said second beams and secure the lower surface thereof to a base,
   spacing means comprising screws threadedly mounted through said L-shaped plates and abutting against the said lip for slightly changing the angle of at least one of the first beams relative to the second beams, the said spacing means being adapted to be fixed relative to said second beams by said tightening bolts.

2. A support as recited in claim 1, comprising threaded rods threadedly mounted sideways on the first beams and aligned with the said second beams, a L-shaped block slidingly mounted on each rod, one arm of said block adapted to wedge into said channel at the end of the second beams and nut means threadedly mounted on the rods for pushing against said blocks when threaded and pulling the said one of the said first beams.

* * * * *